US012662118B2

(12) United States Patent
Wei

(10) Patent No.: US 12,662,118 B2
(45) Date of Patent: Jun. 23, 2026

(54) CONTROL METHOD AND CONTROL APPARATUS FOR VEHICLE TRAVELING, AND VEHICLE

(71) Applicant: Momenta (Suzhou) Technology Co., Ltd., Suzhou (CN)

(72) Inventor: Shujun Wei, Suzhou (CN)

(73) Assignee: Momenta (Suzhou) Technology Co., Ltd., Suzhou (CN)

( * ) Notice: Subject to any disclaimer, the term of this patent is extended or adjusted under 35 U.S.C. 154(b) by 36 days.

(21) Appl. No.: 18/964,152

(22) Filed: Nov. 29, 2024

(65) Prior Publication Data

US 2025/0091574 A1     Mar. 20, 2025

Related U.S. Application Data

(63) Continuation of application No. PCT/CN2023/107136, filed on Jul. 13, 2023.

(30) Foreign Application Priority Data

May 6, 2023     (CN) ......................... 202310504513.5

(51) Int. Cl.
  B60W 30/12     (2020.01)
  B60W 30/18     (2012.01)
(52) U.S. Cl.
  CPC ...... B60W 30/12 (2013.01); B60W 30/18163 (2013.01); B60W 2552/10 (2020.02);
      (Continued)
(58) Field of Classification Search
  CPC ........... B60W 30/12; B60W 30/18163; B60W 2552/10; B60W 2554/4041;
      (Continued)

(56) References Cited

U.S. PATENT DOCUMENTS

| | | | | |
|---|---|---|---|---|
| 9,487,212 | B1 * | 11/2016 | Adam | .................. B60W 30/143 |
| 10,227,072 | B2 * | 3/2019 | Kubota | .................. B60W 30/09 |

(Continued)

FOREIGN PATENT DOCUMENTS

| | | |
|---|---|---|
| CN | 116039623 A | 5/2023 |
| JP | 2013107431 A | 6/2013 |

(Continued)

OTHER PUBLICATIONS

Office Action received for Japanese Patent Application No. 2024-569326, mailed on Oct. 28, 2025, 6 pages (3 pages of English Translation and 3 pages of Original Document).

(Continued)

*Primary Examiner* — Ashley L Redhead, Jr.
(74) *Attorney, Agent, or Firm* — ARENTFOX SCHIFF LLP

(57) ABSTRACT

A control method and a control apparatus for vehicle travelling, and a vehicle. The method includes: recognizing whether an adjacent front vehicle exists in an adjacent lane when a spacing distance between a target vehicle and a front vehicle in a same lane is less than or equal to a blockage distance; obtaining a farthest forward-sensing distance recognized by the target vehicle from the adjacent lane when it is recognized that that an adjacent front vehicle does not exist in the adjacent lane; and controlling the target vehicle to execute a lane change suppression strategy when the farthest forward-sensing distance is less than an observation distance, the lane change suppression strategy representing a strategy that prevents the target vehicle from making a lane change.

9 Claims, 6 Drawing Sheets

Recognizing whether an adjacent front vehicle exists in an adjacent lane when it is recognized that a spacing distance between a target vehicle and a front vehicle in a same lane is less than or equal to a blockage distance — 101

Obtaining a farthest forward-sensing distance recognized by the target vehicle from the adjacent lane when it is not recognized that an adjacent front vehicle does not exist in the adjacent lane — 102

Controlling the target vehicle to execute a lane change suppression strategy when the farthest forward-sensing distance is less than an observation distance — 103

(52) U.S. Cl.
CPC .............. *B60W 2554/4041* (2020.02); *B60W 2554/802* (2020.02)

(58) Field of Classification Search
CPC ........... B60W 2554/802; B60W 30/16; B60W 50/00; B60W 2554/80
See application file for complete search history.

(56) References Cited

U.S. PATENT DOCUMENTS

| | | | | |
|---|---|---|---|---|
| 11,186,279 | B2 * | 11/2021 | Fukuda | B60W 30/12 |
| 2016/0297447 | A1 * | 10/2016 | Suzuki | B60W 30/16 |
| 2017/0259817 | A1 * | 9/2017 | Horiguchi | B60W 50/082 |
| 2019/0168757 | A1 * | 6/2019 | Tokimasa | B60W 40/02 |
| 2019/0193739 | A1 * | 6/2019 | Tokimasa | G06V 20/588 |
| 2019/0241195 | A1 * | 8/2019 | Sakamoto | B62D 6/00 |
| 2019/0256104 | A1 * | 8/2019 | Shimizu | B60W 50/0098 |
| 2020/0180616 | A1 * | 6/2020 | Matsunaga | B60W 30/0956 |
| 2020/0307600 | A1 * | 10/2020 | Sato | G08G 1/167 |
| 2021/0155242 | A1 | 5/2021 | Taniguchi | |
| 2022/0032908 | A1 * | 2/2022 | Matsumoto | B60W 30/165 |
| 2022/0374788 | A1 * | 11/2022 | Tone | G06Q 10/02 |
| 2023/0040783 | A1 * | 2/2023 | Choi | G06V 20/625 |
| 2023/0278551 | A1 * | 9/2023 | Fukuchi | B60W 30/0956 |
| 2023/0311862 | A1 * | 10/2023 | Fukuchi | B62D 6/002 |
| | | | | 701/41 |
| 2024/0085209 | A1 * | 3/2024 | Misumi | B60W 50/14 |
| 2025/0091574 | A1 * | 3/2025 | Wei | B60W 30/12 |
| 2026/0001537 | A1 * | 1/2026 | Hayakawa | B60W 30/12 |

FOREIGN PATENT DOCUMENTS

| | | |
|---|---|---|
| JP | 2016126360 A | 7/2016 |
| JP | 2019025932 A | 2/2019 |
| JP | 2019049812 A | 3/2019 |
| JP | 2021-020580 A | 2/2021 |
| JP | 2023-020393 A | 2/2023 |

OTHER PUBLICATIONS

Internation Search Report dated Dec. 6, 2023 from corresponding PCT Application No. PCT/CN2023/107136.

* cited by examiner

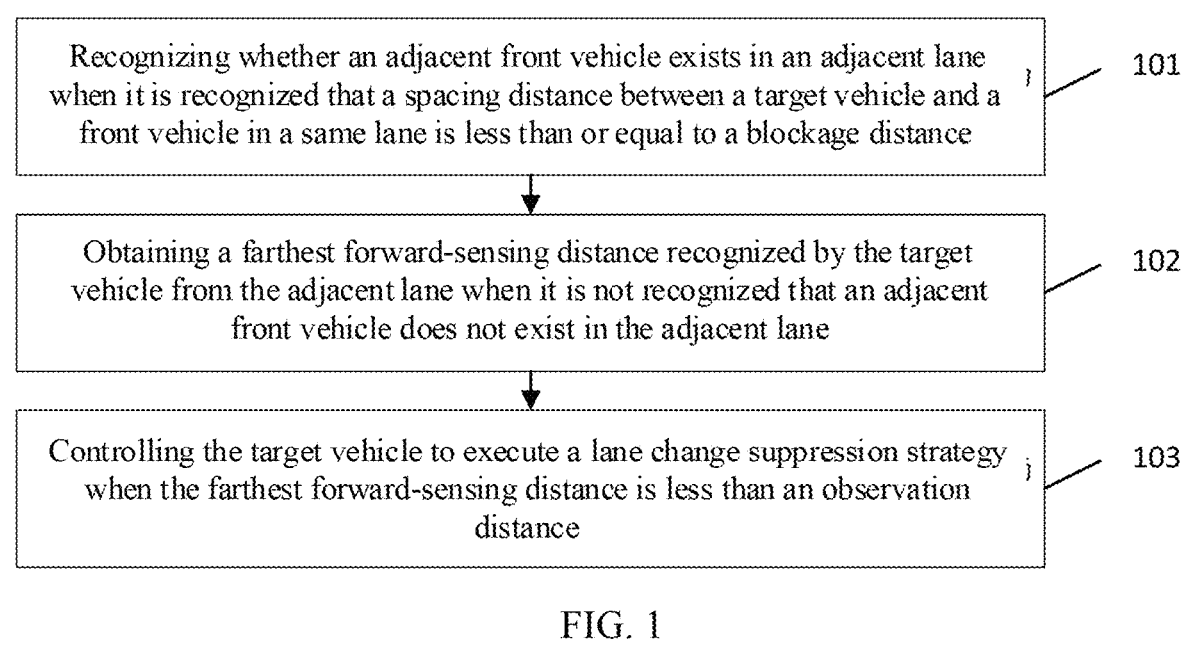

Recognizing whether an adjacent front vehicle exists in an adjacent lane when it is recognized that a spacing distance between a target vehicle and a front vehicle in a same lane is less than or equal to a blockage distance — 101

Obtaining a farthest forward-sensing distance recognized by the target vehicle from the adjacent lane when it is not recognized that an adjacent front vehicle does not exist in the adjacent lane — 102

Controlling the target vehicle to execute a lane change suppression strategy when the farthest forward-sensing distance is less than an observation distance — 103

FIG. 1

CONTROL METHOD AND CONTROL APPARATUS FOR VEHICLE TRAVELING, AND VEHICLE

CROSS-REFERENCE TO RELATED APPLICATION

This application is a continuation of International Application No. PCT/CN2023/107136 filed on Jul. 13, 2023, which claims priority to Chinese Patent Application No. 202310504513.5, filed to China National Intellectual Property Administration on May 6, 2023. The afore-mentioned patent applications are hereby incorporated by reference in their entireties.

TECHNICAL FIELD

The present disclosure relates to the technical field of intelligent driving, and in particular, to a control method and a control apparatus for vehicle travelling, and a vehicle.

BACKGROUND

With the rapid development of an intelligent driving technology, the control over a vehicle travelling process is becoming more and more refined. When a vehicle is traveling and changing a vehicle lane, there is a need to make judgment based on a traveling situation of a front vehicle. Therefore, there is a need to sense a traveling state of the front vehicle in real time.

At present, when traveling, a target vehicle generally directly judges, according to other sensible vehicles, whether to trigger a vehicle lane change. However, when the target vehicle is quite close to the front vehicle, a sensible range may be blocked by the front vehicle, greatly reducing accuracy of judgment of the vehicle lane change, thereby reducing effectiveness of vehicle lane change.

SUMMARY

In view of this, the present disclosure provides a control method and a control apparatus for vehicle travelling, and a vehicle, mainly aiming at solving the problem of poor effectiveness of vehicle lane change in the related art.

In an aspect of the present disclosure, a control method for vehicle travelling is provided and includes: recognizing whether an adjacent front vehicle exists in an adjacent lane when a spacing distance between a target vehicle and a front vehicle in a same lane is less than or equal to a blockage distance; obtaining a farthest forward-sensing distance recognized by the target vehicle from the adjacent lane when it is recognized that an adjacent front vehicle does not exist in the adjacent lane; and controlling the target vehicle to execute a lane change suppression strategy when the farthest forward-sensing distance is less than an observation distance, the lane change suppression strategy representing a strategy that prevents the target vehicle from making a lane change.

In the embodiments of the present disclosure, whether an adjacent front vehicle exists in an adjacent lane is recognized when a spacing distance between a target vehicle and a front vehicle in a same lane is less than or equal to a blockage distance; a farthest forward-sensing distance recognized by the target vehicle from the adjacent lane is obtained when it is recognized that an adjacent front vehicle does not exist in the adjacent lane; and the target vehicle is controlled to execute a lane change suppression strategy when the farthest forward-sensing distance is less than an observation distance, the lane change suppression strategy representing a strategy that prevents the target vehicle from making a lane change. In this way, a purpose of accurately performing lane change suppression on a premise that the front vehicle is blocked is achieved in a manner of triggering lane change suppression within a blockage distance, thereby preventing inaccurate judgment of a lane change due to a close distance to the front vehicle, and greatly improving accuracy of judgment of a vehicle lane change.

Further, the control method further includes: obtaining a first traveling velocity of the adjacent front vehicle when it is recognized that an adjacent front vehicle exists in the adjacent lane; determining lane traffic efficiency of the adjacent lane based on the first traveling velocity; and controlling the target vehicle to make a lane change to the adjacent lane when the lane traffic efficiency is greater than lane change traffic efficiency.

Further, the control method further includes: obtaining vehicle traffic efficiency of the adjacent lane when the farthest forward-sensing distance is greater than or equal to an observation distance; and controlling the target vehicle to make a lane change to a target lane when the lane traffic efficiency is greater than lane change traffic efficiency.

Further, prior to the recognizing whether an adjacent front vehicle exists in an adjacent lane, the control method further includes: obtaining a second traveling velocity of the front vehicle; and obtaining the spacing distance between the target vehicle and the front vehicle when the second traveling velocity is less than a preset lane velocity limit.

Further, prior to the recognizing whether an adjacent front vehicle exists in an adjacent lane, the control method further includes: configuring an observation distance as a preset observation distance; obtaining lane width information and vehicle width information of the front vehicle; and determining a blockage distance in real time based on the lane width information, the vehicle width information, and the preset observation distance.

Further, the control method further includes: configuring a blockage distance as a preset blockage distance; obtaining lane width information and vehicle width information of the front vehicle; and determining the observation distance in real time based on the lane width information, the vehicle width information, and the preset blockage distance.

Further, the controlling the target vehicle to execute a lane change suppression strategy includes: starting a cooling timer in the lane change suppression strategy; and continuing the control method when a timing duration of the cooling timer reaches a preset cooling duration.

In another aspect of the present disclosure, a control apparatus for vehicle travelling is provided and includes: a recognition module configured to recognize whether an adjacent front vehicle exists in an adjacent lane when a spacing distance between a target vehicle and a front vehicle in a same lane is less than or equal to a blockage distance; an obtaining module configured to obtain a farthest forward-sensing distance recognized by the target vehicle from the adjacent lane when it is recognized that an adjacent front vehicle does not exist in the adjacent lane; and a control module configured to control the target vehicle to execute a lane change suppression strategy when the farthest forward-sensing distance is less than an observation distance, the lane change suppression strategy representing a strategy that prevents the target vehicle from making a lane change.

Further, the control apparatus further includes a determination module. The obtaining module is further configured to obtain a first traveling velocity of the adjacent front vehicle when it is recognized that an adjacent front vehicle exist in the adjacent lane; and the determination module is configured to determine lane traffic efficiency of the adjacent lane based on the first traveling velocity; and the control module is further configured to control the target vehicle to make a lane change to the adjacent lane when the lane traffic efficiency is greater than lane change traffic efficiency.

Further, the obtaining module is further configured to obtain vehicle traffic efficiency of the adjacent lane when the farthest forward-sensing distance is greater than or equal to an observation distance; and the control module is further configured to control the target vehicle to make a lane change to a target lane when the lane traffic efficiency is greater than lane change traffic efficiency.

Further, the obtaining module is further configured to obtain a second traveling velocity of the front vehicle; and obtain the spacing distance between the target vehicle and the front vehicle when the second traveling velocity is less than a preset lane velocity limit.

Further, the control apparatus further includes: a first configuration module. The first configuration module is configured to configure an observation distance as a preset observation distance; the obtaining module is further configured to obtain lane width information and vehicle width information of the front vehicle; and the determination module is further configured to determine a blockage distance in real time based on the lane width information, the vehicle width information, and the preset observation distance.

Further, the control apparatus further includes a second configuration module. The second configuration module is configured to configure the blockage distance as a preset blockage distance; the obtaining module is further configured to obtain lane width information and vehicle width information of the front vehicle; and the determination module is further configured to determine the observation distance in real time based on the lane width information, the vehicle width information, and the preset blockage distance.

Further, the control module is configured to start a cooling timer in the lane change suppression strategy; and continue the control method for vehicle travelling when a timing duration of the cooling timer reaches a preset cooling duration.

In another aspect of the present disclosure, a vehicle is provided and includes the control apparatus for vehicle travelling as described above.

In another aspect of the present disclosure, a readable storage medium is provided, and stores a program or an instruction, and when the program or the instruction is executed by a processor, steps in the control method for vehicle travelling as described above are implemented.

In another aspect of the present disclosure, a computer device is provided, and includes at least one processor. The at least one processor is coupled to a memory, a program or an instruction run on the processor is stored in the memory, and when the program or instruction is executed by the processor, steps in the control method for vehicle travelling as described above are implemented.

The foregoing description is merely an overview of the technical solutions of the present disclosure. To better illustrate the present disclosure, implementation can be performed according to content of the specification. Moreover, to make the foregoing and other objectives, features, and advantages of the present disclosure more comprehensible, some embodiments of the present disclosure are described in the following description.

BRIEF DESCRIPTION OF DRAWINGS

Through detailed description in the following embodiments, other advantages and beneficial effects will become apparent for those skilled in the art. The accompanying drawings are merely for illustrating some embodiments, rather than for limiting the present disclosure. Moreover, in the drawings, a same reference numeral represents a same part.

FIG. 1 is a flowchart of a control method for vehicle travelling according to some embodiments of the present disclosure;

DESCRIPTION OF EMBODIMENTS

Exemplary embodiments of the present disclosure will be described in more details below with reference to the accompanying drawings. Although the exemplary embodiments of the present disclosure are shown in the accompanying drawings, it is to be understood that the present disclosure may be implemented in various forms and shall not be limited to the embodiments described herein. Rather, these embodiments are provided for better illustration of the present disclosure and to better illustrate a scope of the present disclosure to those skilled in the art.

Some embodiments of the present disclosure provide a control method for vehicle travelling. As shown in FIG. 1, the method includes the following steps.

At 101, whether an adjacent front vehicle exists in an adjacent lane is recognized when a spacing distance between a target vehicle and a front vehicle in a same lane is less than or equal to a blockage distance.

Figure 2:
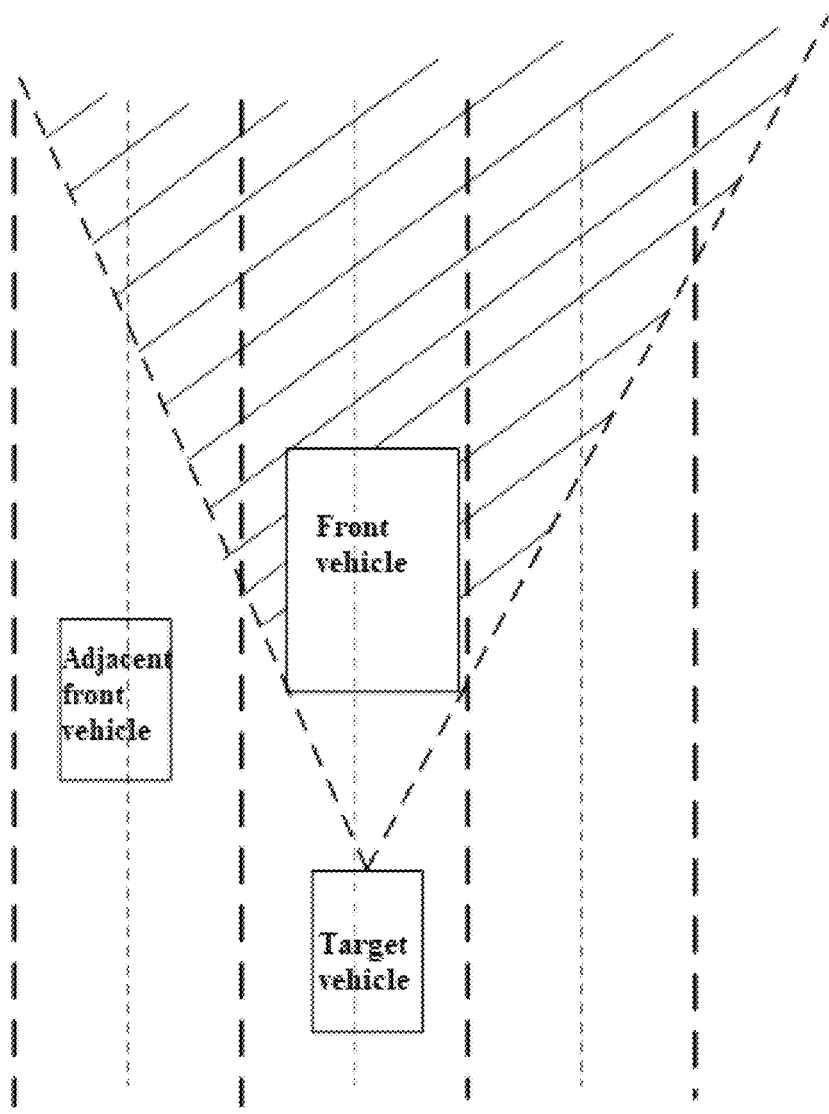
FIG. 2 is a schematic diagram of blockage of a front vehicle according to some embodiments of the present disclosure.

In some embodiments of the present disclosure, during trajectory planning of a driverless intelligent vehicle, an automatic driving processor as a current execution body may be a processor configured on a vehicle, a cloud server that matches the vehicle, or the like. In this case, the current execution body may obtain, through a sensing system, the spacing distance between the target vehicle and the front vehicle in real time, to judge whether a view of the target vehicle is blocked by the front vehicle. In this case, since the sensing system is a device that captures images in units of time frames, when the sensing system is configured on the target vehicle, an blocked part may affect a perceived view of the sensing system, which may trigger an unreasonable lane change strategy of the vehicle. In some embodiments of the present disclosure, whether there is blockage may be judged based on the spacing distance. The spacing distance is a distance between the target vehicle and the front vehicle. If the spacing distance is less than a preset or calculated blockage distance, it indicates that the view of the target vehicle is blocked by the front vehicle, and sensing of a lane condition in front of the target vehicle may have a blind spot due to the blockage by the front vehicle. As shown in FIG. 2, a shaded part is a part of the target vehicle blocked by the front vehicle. Therefore, in order to prevent inaccurate triggering of overtaking or lane changing due to blockage, the current execution body recognizes whether an adjacent front vehicle exists in an adjacent lane. Herein, an adjacent lane may be a left lane or a right lane, and an adjacent front vehicle is a vehicle in front of the target vehicle in an adjacent lane, for example, an adjacent front vehicle in a left adjacent lane as shown in FIG. 2. In addition, the blockage distance represents a maximum distance at which an unreasonable planning decision may be made due to a limited sensing range caused by the blockage of the target vehicle by the front vehicle. When the distance between the target vehicle and the front vehicle is greater than the blockage distance, the blockage of the target vehicle by the front vehicle may not affect a sensing result of the target vehicle for a lane environment in front of it, and this is an acceptable vehicle distance for the target vehicle. The blockage distance may be preset based on factors such as industry standards, statistical data, lane change effectiveness requirements, number of vehicle takeovers, or vehicle traffic efficiency, or may be calculated in real time based on sensed information. For example, the blockage distance may be configured based on different widths of large or small cars, different lane velocity limits, different vehicle travelling velocities, or the like, for example, the blockage distance may be 40 m or 30 m, which will not be limited in the embodiments of the present disclosure.

It is to be noted that the vehicle refers to a vehicle with an automatic control system in an automatic driving scene, including a passenger vehicle and a commercial vehicle. The passenger vehicle may be, but is not limited to, a sedan, a sport utility vehicle, a multi-person commercial vehicle, and the like. The commercial vehicle may be, but is not limited to, a pickup truck, a minibus, a self-unloading truck, a truck, a tractor, a trailer, a mining vehicle, and the like. In this case, the vehicle can realize automatic driving based on the automatic control system.

At 102, a farthest forward-sensing distance recognized by the target vehicle from the adjacent lane is obtained when it is recognized that an adjacent front vehicle exists in the adjacent lane.

Figure 3:
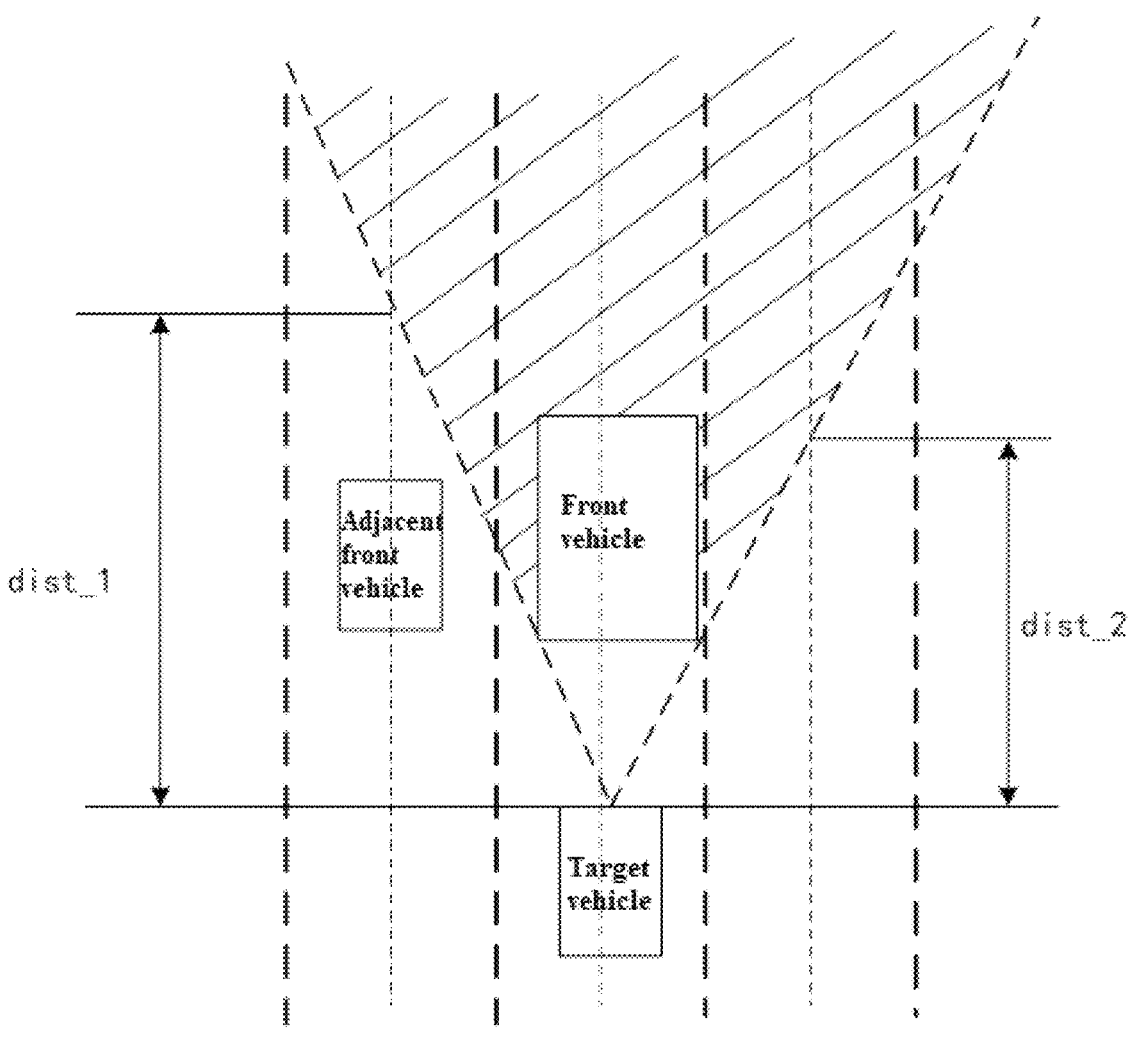
FIG. 3 is a schematic diagram of a farthest forward-sensing distance according to some embodiments of the present disclosure.

In some embodiments of the present disclosure, when the current execution body recognizes that an adjacent front vehicle does not exists in the adjacent lane, in order to improve accuracy of a lane change to the adjacent lane, a farthest forward-sensing distance recognized by the target vehicle from the adjacent lane is obtained. Herein, the farthest forward-sensing distance is a farthest forward-sensing distance of the adjacent lane observable by the target vehicle in a direction of vehicle travelling. For example, a point on a lane centerline of the adjacent lane and a preset position point on a body of a target vehicle may be selected as observation points to calculate a farthest forward-sensing distance. As shown in FIG. 3, dist_1 denotes a farthest forward-sensing distance obtained by the target vehicle from a left adjacent lane, and dist_2 denotes a farthest forward-sensing distance obtained by the target vehicle from a right adjacent lane.

Figure 4:
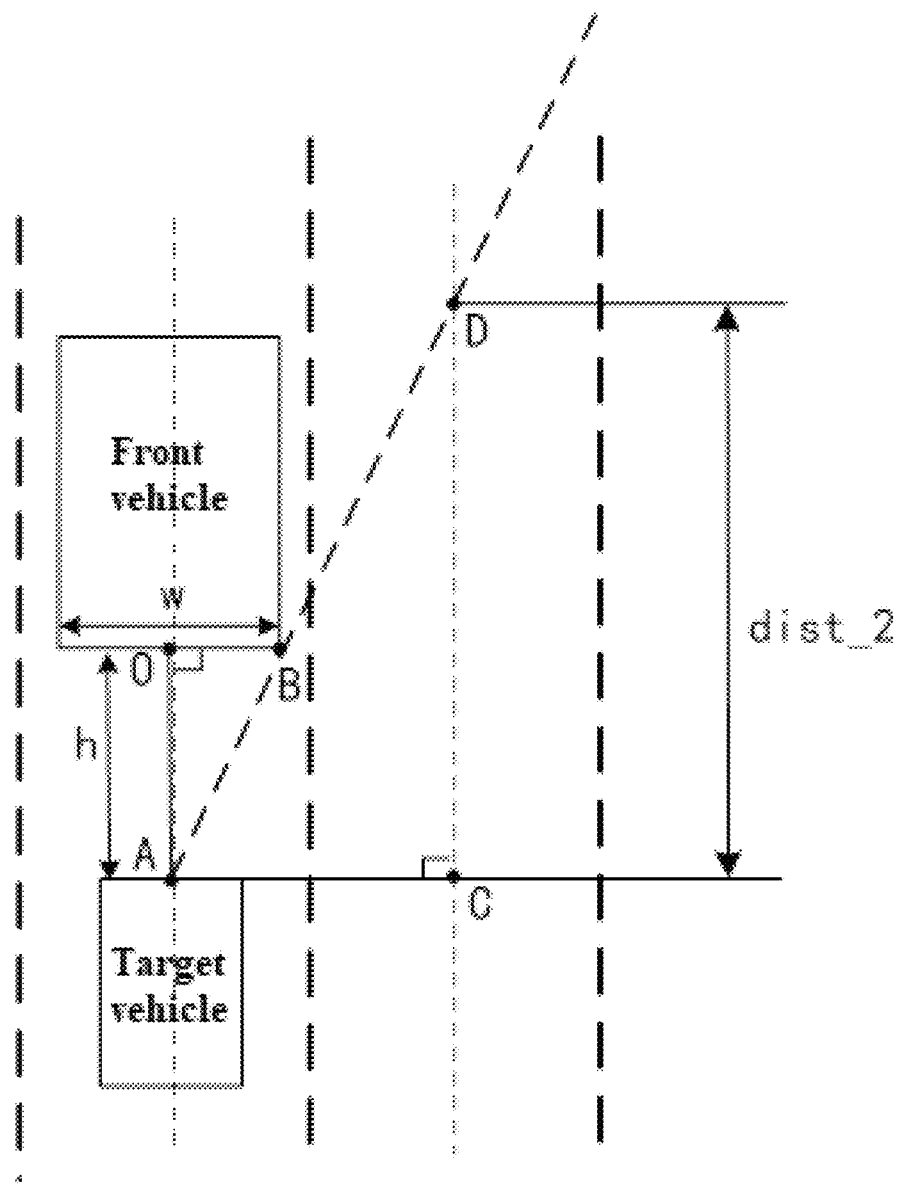
FIG. 4 is a schematic diagram of a blockage distance according to some embodiments of the present disclosure.

It is to be noted that, as shown in FIG. 4, a right-angled triangle formed by the farthest forward-sensing distance dist_2 or CD, an extension length AD, and AC formed by connecting a midpoint position of the target vehicle and a centerline position of the adjacent lane is similar to a right-angled triangle formed by a blockage distance h, an extension length AB, and a vehicle width OB of the front vehicle corresponding to a midpoint position of the front vehicle. Therefore, the farthest forward-sensing distance dist_2 may be calculated by sensing the blockage distance h and the vehicle width in real time, which will not be limited in the embodiments of the present disclosure.

At 103, the target vehicle is controlled to execute a lane change suppression strategy when the farthest forward-sensing distance is less than an observation distance.

In some embodiments of the present disclosure, when the current execution body determines that the farthest forward-sensing distance is less than the observation distance, indicating that the target vehicle is blocked by the front vehicle, and whether an adjacent vehicle that affects effectiveness of a lane change of the target vehicle exists in the adjacent lane cannot be determined. In this case, the current execution body controls the target vehicle to execute a lane change suppression strategy to prevent a possibility of a wrong lane change judgment made by the target vehicle due to blockage, thereby reducing a possibility of repeated lane changes and improving effectiveness of a vehicle lane change. The lane change suppression strategy represents a strategy that prevents the target vehicle from making a lane change, and is an execution method preset in the current execution body. The current execution body, when determining that the farthest forward-sensing distance is less than the observation distance, calls this lane change suppression strategy to start to prevent a situation where effectiveness of a lane change is affected by presence of a vehicle in the blocked part when the change is made to the adjacent lane. In addition, the observation distance represents a maximum distance observable by the target vehicle from the adjacent lane. A specific value may be preset according to a user requirement, or calculated according to an algorithm based on real-time sensor data. For example, in some embodiments, the farthest forward-sensing distance may be configured as 100 m, 200 m, or the like, which will not be limited in the embodiments of the present disclosure.

It is to be noted that, in some embodiments of the present disclosure, both the observation distance and the blockage distance may be configured manually, or one of the observation distance and the blockage distance is configured while the other one of the observation distance and the blockage distance is calculated according to a triangular geometric relationship. In this case, any one of the observation distance and the blockage distance can be configured while the other one of the observation distance and the blockage distance is calculated, which will not be limited in the embodiments of the present disclosure.

In some other embodiments of the present disclosure, the control method further includes: obtaining a first traveling velocity of the adjacent front vehicle when it sis recognized that an adjacent front vehicle exists in the adjacent lane; determining lane traffic efficiency of the adjacent lane based on the first traveling velocity; and controlling the target vehicle to make a lane change to the adjacent lane when the lane traffic efficiency is greater than lane change traffic efficiency.

In order to meet a requirement for flexibility in control over the vehicle and improve effectiveness of the control over the vehicle, when the current execution body recognizes an adjacent front vehicle exists in the adjacent lane, for example, the adjacent front vehicle in the left adjacent lane shown in FIG. 3, a traveling velocity of the adjacent front vehicle is obtained to judge, based on the traveling velocity of the adjacent front vehicle, whether a lane change may be made. The current execution body calculates lane traffic efficiency of the adjacent lane based on the first traveling velocity. In this case, the lane traffic efficiency represents a smooth traffic condition when the target vehicle is expected to enter the adjacent lane. Greater lane traffic efficiency indicates that the smooth traffic condition is better in the lane if the vehicle travels faster in the lane. When the lane traffic efficiency is greater than the lane change traffic efficiency, it indicates that the adjacent lane is suitable for the target vehicle to make a lane change, so the target vehicle is controlled to make a lane change to the adjacent lane. The lane change traffic efficiency may be directly configured as traffic efficiency of the lane where the target vehicle is located, or may be preset according to a user requirement. Since the lane traffic efficiency is calculated based on a velocity, the lane change traffic efficiency may be configured based on a requirement for a velocity at which the target vehicle makes a normal lane change, which will not be limited in the embodiments of the present disclosure.

It is to be noted that, in some embodiments of the present disclosure, the lane traffic efficiency is calculated based on a velocity. In a specific implementation scene where lane traffic efficiency of the adjacent lane is calculated, the lane traffic efficiency may be calculated based on an accelerating velocity and/or acceleration of the adjacent front vehicle in the adjacent lane. First, a traffic efficiency cost of the adjacent front vehicle in the adjacent lane is calculated based on a velocity difference between the accelerating velocity and an initial velocity, an interval influence weight value, and a unit velocity difference cost parameter. In this case, the traffic efficiency cost represents a congestion condition when the target vehicle enters the adjacent lane and is expected to travel (which may accelerate or travel at a constant velocity). The traffic efficiency cost is negatively correlated with the vehicle traffic efficiency. That is, if traffic efficiency costs of other vehicles are greater, a situation is more serious where they are expected to prevent the target vehicle from making a lane change, resulting in lower lane traffic efficiency. In addition, the velocity difference between the accelerating velocity and the initial velocity is determined first. The accelerating velocity of the adjacent front vehicle may be scanned and obtained by the sensing system, and the velocity difference may be determined based on a comparison with a stationary state. For example, the velocity difference is max ($v\_set-t0\_v$, $0.0$), where $v\_set$ denotes an accelerating velocity, and $t0\_v$ denotes an initial velocity. Then, the traffic efficiency cost is calculated based on the velocity difference, the interval influence weight value, and the unit velocity difference cost parameter. A calculation method is as follows: traffic efficiency cost=velocity difference×unit velocity difference cost parameter×interval influence weight value. The interval influence weight value is configured based on a steady-state following factor with a configuration range that is preferably [0.0, 0.1], and the unit velocity difference cost parameter is an adjustable condition within a unit velocity, preferably 3.5, which will not be limited in the embodiments of the present disclosure.

In some other embodiments of the present disclosure, the method further includes: obtaining vehicle traffic efficiency of the adjacent lane when the farthest forward-sensing distance is greater than or equal to an observation distance; and controlling the target vehicle to make a lane change to a target lane when the lane traffic efficiency is greater than lane change traffic efficiency.

In order to prevent ineffective lane changes and repeated lane changes of the vehicle and improve effectiveness of the lane changes, when the current execution body determines that the farthest forward-sensing distance is greater than or equal to the observation distance, indicating that it is sufficient for the target vehicle to make an effective lane change based on the farthest forward-sensing distance when it is recognized that an adjacent front vehicle does not exist in the adjacent lane, so the current execution body obtains the lane traffic efficiency of the adjacent lane. The lane traffic efficiency is calculated in a same method as the foregoing lane traffic efficiency. Certainly, since it is recognized that an adjacent front vehicle does not exist in the adjacent lane, the lane traffic efficiency may be calculated based on a following vehicle in the adjacent lane, or fixed lane traffic efficiency may be configured directly based on absence of vehicles in the adjacent lane, which will not be limited in the embodiments of the present disclosure. When the lane traffic efficiency is greater than the lane change traffic efficiency, indicating that the adjacent lane is suitable for the target vehicle to make a lane change, so the target vehicle is controlled to make a lane change to the target lane. Since the lane traffic efficiency is calculated based on a velocity, the lane change traffic efficiency may be configured based on a requirement for a velocity at which the target vehicle makes a normal lane change, which will not be limited in the embodiments of the present disclosure.

It is to be noted that, in different application scenes, the lane traffic efficiency may be configured in advance for a situation where it is recognized that an adjacent front vehicle does not exist in the adjacent lane. For example, the lane traffic efficiency may be directly configured as 100, so that the current execution body, after determining that the lane traffic efficiency is greater than the lane change traffic efficiency (for example 20, 10), controls the target vehicle to make a lane change to the adjacent lane, to achieve a purpose of preventing an inaccurate lane change caused by blockage based on judgment of the farthest forward-sensing distance.

In addition, in some embodiments of the present disclosure, in order to speed up the efficiency of control over the vehicle lane change, when it is determined that the farthest forward-sensing distance is greater than or equal to the observation distance, indicating that the target vehicle may complete a lane change safely and effectively within the preset observation distance, so the current execution body may directly control the target vehicle to make a lane change, which will not be limited in the embodiments of the present disclosure. At the same time, the sensing system in the embodiments of the present disclosure may also recognize in real time whether a lane line to which the target vehicle belongs is a solid line, so as to control the vehicle to disable the control method for vehicle travelling under the solid line.

In some other embodiments of the present disclosure, prior to the recognizing whether an adjacent front vehicle exists in an adjacent lane, the method further includes: obtaining a second traveling velocity of the front vehicle; and obtaining a spacing distance between the target vehicle and the front vehicle when the second traveling velocity is less than a preset lane velocity limit.

In order to effectively determine blockage of the target vehicle by the front vehicle to improve effectiveness of control over lane changing when the vehicle is blocked by the front vehicle, the current execution body obtains a second traveling velocity of the front vehicle. The front vehicle may be a vehicle with a different width. For example, if the vehicle width is 2.76 m, the front vehicle is a large vehicle, and if the vehicle width is 1.94 m, the front vehicle is a small vehicle, which will not be limited in the embodiments of the present disclosure. The current execution body may obtain a traveling velocity of the front vehicle through the sensing system, so as to compare with the preset lane velocity limit. In this case, preset lane velocity limits corresponding to different lanes may be different or the same, or may be configured based on a minimum velocity at which the vehicle travels on the lane or Configured based on a lane changing requirement, which will not be limited in the embodiments of the present disclosure. When the traveling velocity of the front vehicle is less than a preset lane velocity limit, indicating that the front vehicle travels slowly and the target vehicle is easily blocked by the front vehicle, so the current execution body obtains the spacing distance between the target vehicle and the front vehicle.

In some other embodiments of the present disclosure, prior to the recognizing whether an adjacent front vehicle exists in an adjacent lane, the method further includes: configuring the observation distance as a preset observation distance; obtaining lane width information and vehicle width information of the front vehicle; and determining the blockage distance in real time based on the lane width information, the vehicle width information, and the preset observation distance.

In order to achieve flexible control over vehicle travelling and meet a requirement for effective lane change suppression with respect to different blockage situations, in an application scene, the current execution body may preset the observation distance. That is, the observation distance for comparison with the farthest forward-sensing distance is configured as the preset observation distance. The preset observation distance may be configured based on sensing capability of the sensing system. For example, if a maximum recognition distance of the sensing system is 200 m, then the preset observation distance may be configured as 200 m, which will not be limited in the embodiments of the present disclosure. At the same time, the current execution body may obtain a lane width based on basic map information or a global positioning system (GPS). Different lanes may have a same width or different widths. During forward scanning and recognition, the sensing system may scan a vehicle width w of the front vehicle to calculate the blockage distance in real time.

It is to be noted that, in an application scene, as shown in FIG. 4, when calculating the blockage distance h, the lane width information is a sum of a distance extending horizontally from a midpoint of the target vehicle to a side lane line corresponding to the lane of the target vehicle and half a lane width of an adjacent lane, and can be recognized based on the sensing system, which will not be limited in the embodiments of the present disclosure. The configured observation distance is preferably 100 m. In this case, a triangle AOB is similar to a triangle DCA. Therefore, the blockage distance corresponding to the lane width information, the vehicle width information, and the preset observation distance may be calculated based on a triangular geometric relationship. For example, a vehicle width front_vehicle_width includes a vehicle width big_car_width=2.67 m (a big car) and a vehicle width small_car_width=2.67 m (a small car); a lane width lane_width is equal to a sum of a distance extending horizontally from a midpoint of the target vehicle to a side lane line corresponding the lane of the target vehicle "half_ego_left_width" and half a lane width of an adjacent lane "half_target_lane_width", that is, lane_width=half_target_lane_width+half_ego_left_width, preferably 3.5 m. The configured observation distance is min_visible_dist=100 m. Then, when calculation is performed based on the triangular geometric relationship, $$0.5 * front\_vehicle\_width/lane\_width =$$

$$d\_thesh/min\_visible\_dist \Rightarrow d\_thresh =$$

$$0.5 * front\_vehicle\_width * min\_visible\_dist/lane\_width,$$

where d_thresh denotes a blockage distance. In this case, a blockage distance of a big car is big_car_thresh=0.5*2.76*100/3.5=39.4, and the blockage distance of the big car may be configured as 40 m; and a blockage distance of a big car is small_car_thresh=0.5*1.94*100/3.5=27.7, and the blockage distance of the small car may be configured as 30 m, which will not be limited in the embodiments of the present disclosure.

In some other embodiments of the present disclosure, the method further includes: configuring the blockage distance as a preset blockage distance; obtaining lane width information and vehicle width information of the front vehicle; and determining the observation distance in real time based on the lane width information, the vehicle width information, and the preset blockage distance.

In order to achieve flexible control over vehicle travelling and meet a requirement for effective lane change suppression with respect to different blockage situations, in an application scene, the current execution body may preset the blockage distance. That is, the blockage distance for comparison with the spacing distance is configured as the preset blockage distance. The preset blockage distance may be configured based on sensing capability of the sensing system or configured based on a safe following distance. For example, when the front vehicle is a large vehicle, the safe following distance is more than 40 m, and when the front vehicle is a small vehicle, the safe following distance is more than 30 m. Therefore, the preset blockage distance is greater than a minimum safe following distance, which will not be limited in the embodiments of the present disclosure. At the same time, the current execution body may obtain a lane width based on basic map information or a GPS. Different lanes may have a same width or different widths. As shown in FIG. 4, during forward scanning and recognition, the sensing system may scan a vehicle width w of the front vehicle to calculate the observation distance in real time.

It is to be noted that, in an application scene, as shown in FIG. 4, when calculating the observation distance h, the lane width information is a sum of a distance extending horizontally from a midpoint of the target vehicle to a side lane line corresponding to the lane of the target vehicle and half a lane width of an adjacent lane, and may be recognized based on the sensing system, which will not be limited in the embodiments of the present disclosure. The configured blockage distance h is preferably that the blockage distance of a big car is 40 m and the blockage distance of a small car is 30 m. In this case, a triangle AOB is similar to a triangle DCA. The observation distance corresponding to the lane width information, the vehicle width information, and the configured blockage distance may be calculated based on a triangular geometric relationship. For example, in a scene where the front vehicle is a big car, a vehicle width front_vehicle_width includes a vehicle width of a big car big_car_width=2.67 m, a lane width lane_width is equal to a sum of a distance extending horizontally from a midpoint of the target vehicle to a side lane line corresponding to the lane of the target vehicle half_ego_left_width and half a lane width of an adjacent lane half_target_lane_width, that is, lane_width=half_target_lane_width+half_ego_left_width, preferably 3.5 m, the configured blockage distance of the big car is 40 m, and when calculation is performed based on the triangular geometric relationship, $$0.5 * \text{front\_vehicle\_width/lane\_width} =$$
$$\text{d\_thesh/min\_visible\_dist} \Rightarrow \text{min\_visible\_dist} =$$
$$\text{d\_thresh} * \text{lane\_width}/(0.5 * \text{front\_vehicle\_width}),$$

where d_thresh denotes the configured blockage distance min_visible_dist=40*3.5/(0.5*2.67)=104.9 m, and the observation distance of the big car may be configured as 120 m, which will not be limited in the embodiments of the present disclosure.

In some other embodiments of the present disclosure, controlling the target vehicle to execute a lane change suppression strategy includes: starting a cooling timer in the lane change suppression strategy; and continuing the control method for vehicle travelling as described in steps 101 to 103 when a timing duration of the cooling timer reaches a preset cooling duration.

In order to prevent an influence on effectiveness of a vehicle lane change due to blockage by the front vehicle, the current execution body may execute the lane change suppression strategy by a cooling timer in the lane change suppression strategy to compare the timing duration after the cooling timer with the preset cooling duration. The lane change suppression strategy is a method for preventing the target vehicle from making a lane change to the adjacent lane. In this case, a preset cooling duration is preset in the lane change suppression strategy, so that, after the cooling timer is started, the spacing distance between the target vehicle and the front vehicle is updated when the timing duration reaches the preset cooling duration, so as to re-judge, based on the updated spacing distance, whether the target vehicle is blocked by the front vehicle. When it is judged based on the updated spacing distance that the target vehicle is still blocked by the front vehicle, steps 101 to 103 may be re-performed. When it is judged based on the updated spacing distance that the target vehicle is not blocked by the front vehicle (the spacing distance is greater than the blockage distance), a lane change execution strategy, a path planning execution strategy, or the like configured in the current execution body may be executed, which will not be limited in the embodiments of the present disclosure.

The embodiments of the present disclosure provide a control method for vehicle travelling. Whether an adjacent front vehicle exists in an adjacent lane is recognized when a spacing distance between a target vehicle and a front vehicle in a same lane is less than or equal to a blockage distance; a farthest forward-sensing distance recognized by the target vehicle from the adjacent lane is obtained when it is recognized that an adjacent front vehicle does not exist in the adjacent lane; and the target vehicle is controlled to execute a lane change suppression strategy when the farthest forward-sensing distance is less than an observation distance, the lane change suppression strategy representing a strategy that prevents the target vehicle from making a lane change. In this way, a purpose of accurately performing lane change suppression on a premise that the front vehicle is blocked is achieved in a manner of triggering lane change suppression within the blockage distance, thereby preventing inaccurate judgment of a lane change due to a close distance to the front vehicle, and thus greatly improving accuracy of judgment of a vehicle lane change.

Figure 5:
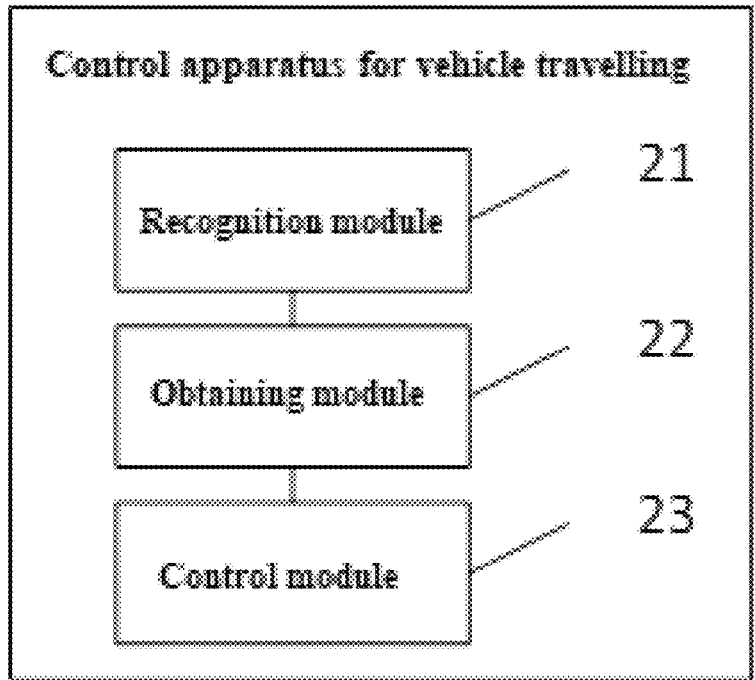
FIG. 5 is a block diagram of components of a control apparatus for vehicle travelling according to some embodiments of the present disclosure.

Further, as an implementation for the above-mentioned method shown in FIG. 1, the embodiments of the present disclosure provide a control apparatus for vehicle travelling. As shown in FIG. 5, the apparatus includes: a recognition module 21, an obtaining module 22, and a control module 23.

The recognition module 21 is configured to recognize whether an adjacent front vehicle exists in an adjacent lane when a spacing distance between a target vehicle and a front vehicle in a same lane is less than or equal to a blockage distance.

The obtaining module 22 is configured to obtain a farthest forward-sensing distance recognized by the target vehicle from the adjacent lane when it is recognized that an adjacent front vehicle does not exist in the adjacent lane.

The control module 23 is configured to control the target vehicle to execute a lane change suppression strategy when the farthest forward-sensing distance is less than an observation distance, the lane change suppression strategy representing a strategy that prevents the target vehicle from making a lane change.

Further, the apparatus further includes: a determination module. The obtaining module is further configured to obtain a first traveling velocity of the adjacent front vehicle when it is recognized that an adjacent front vehicle exists in the adjacent lane; the determination module is configured to determine lane traffic efficiency of the adjacent lane based on the first traveling velocity; and the control module is further configured to control the target vehicle to make a lane change to the adjacent lane when the lane traffic efficiency is greater than lane change traffic efficiency.

Further, the obtaining module is further configured to obtain vehicle traffic efficiency of the adjacent lane when the farthest forward-sensing distance is greater than or equal to an observation distance. The control module is further configured to control the target vehicle to make a lane change to a target lane when the lane traffic efficiency is greater than lane change traffic efficiency.

Further, the obtaining module is further configured to obtain a second traveling velocity of the front vehicle; and obtain a spacing distance between the target vehicle and the front vehicle when the second traveling velocity is less than a preset lane velocity limit.

Further, the apparatus further includes: a first configuration module. The first configuration module is configured to configure the observation distance as a preset observation distance; the obtaining module is further configured to obtain lane width information and vehicle width information of the front vehicle; and the determination module is further configured to determine the blockage distance in real time based on the lane width information, the vehicle width information, and the preset observation distance.

Further, the apparatus further includes: a second configuration module. The second configuration module is configured to configure the blockage distance as a preset blockage distance; the obtaining module is further configured to obtain lane width information and vehicle width information of the front vehicle; and the determination module is further configured to determine the observation distance in real time based on the lane width information, the vehicle width information, and the preset blockage distance.

Further, the control module is configured to start a cooling timer in the lane change suppression strategy; and continue the control method for vehicle travelling when a timing duration of the cooling timer reaches a preset cooling duration.

The embodiments of the present disclosure provide a control apparatus for vehicle travelling. Whether an adjacent front vehicle exists in an adjacent lane is recognized when a spacing distance between a target vehicle and a front vehicle in a same lane is less than or equal to a blockage distance; a farthest forward-sensing distance recognized by the target vehicle from the adjacent lane is obtained when it is recognized that an adjacent front vehicle does not exist in the adjacent lane; and the target vehicle is controlled to execute a lane change suppression strategy when the farthest forward-sensing distance is less than an observation distance, the lane change suppression strategy representing a strategy that prevents the target vehicle from making a lane change. In this way, a purpose of accurately performing lane change suppression on a premise that the front vehicle is blocked is achieved in a manner of triggering lane change suppression within the blockage distance, thereby preventing inaccurate judgment of a lane change due to a close distance to the front vehicle, and thus greatly improving accuracy of judgment of a vehicle lane change.

According to some embodiments of the present disclosure, a vehicle is provided and includes the vehicle travelling control apparatus as described above.

According to some embodiments of the present disclosure, a readable storage medium is provided. The readable storage medium stores a program or an instruction. When the program or instruction is executed by the processor, steps in the control method for vehicle travelling as described above are implemented.

Figure 6:
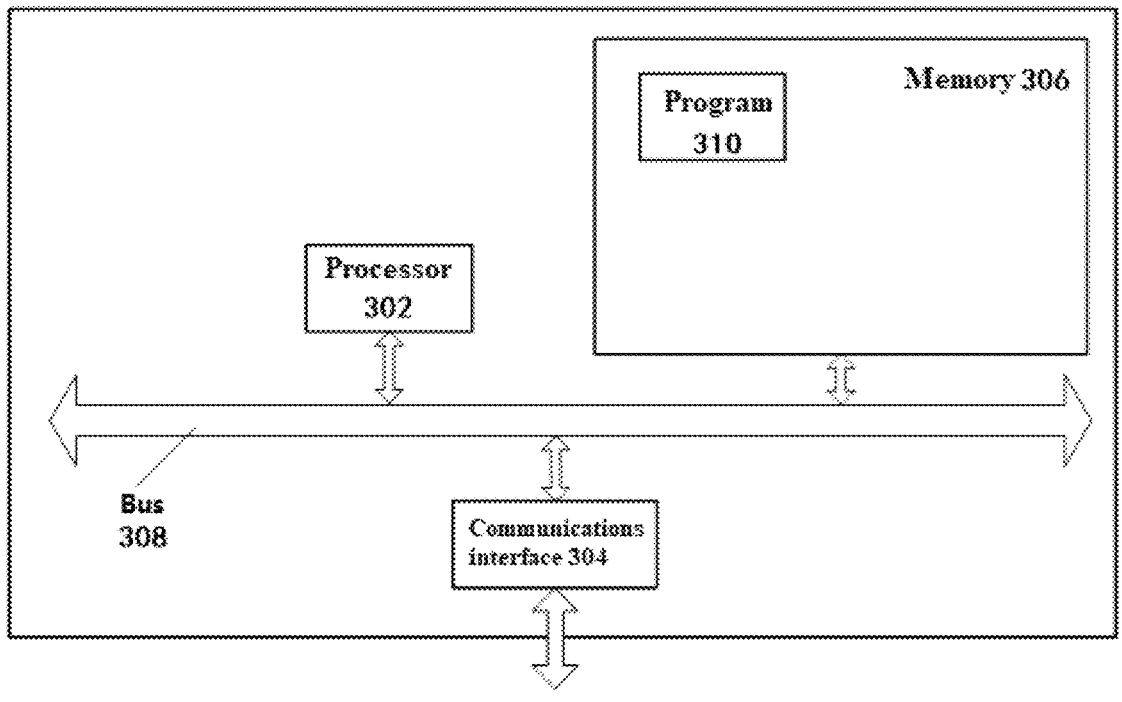
FIG. 6 is a schematic structural diagram of a computer device according to some embodiments of the present disclosure.

FIG. 6 is a schematic structural diagram of a computer device according to some embodiments of the present disclosure, including at least one processor. The processor is coupled to a memory, a program or an instruction run on the processor is stored in the memory, and when the program or instruction is executed by the processor, steps in the control method for vehicle travelling as described above are implemented. Specific embodiments of the present disclosure do not limit specific implementation of the computer device.

As shown in FIG. 6, the computer device may include: a processor 302, a communications interface 304, a memory 306, and a communications bus 308.

The processor 302, the communications interface 304, and the memory 306 communicate with each other by using the communications bus 308.

The communications interface 304 is configured to communicate with network elements of other devices such as clients or other servers.

The processor 302 is configured to perform a program 310, for example, perform related steps in the embodiments of the control method for vehicle travelling described above.

For example, the program 310 may include program codes. The program codes include computer operating instructions.

The processor 302 may be a central processing unit (CPU) or an Application Specific Integrated Circuit (ASIC), or one or more integrated circuits configured to implement embodiments of the present disclosure. The one or more processors included in the computer device may be processors of a same type, for example, one or more CPUs; or processors of different types, for example, one or more CPUs and one or more ASICs.

The memory 306 is configured to store the program 310. The memory 306 may include a high-velocity random access memory (RAM), and may also include a non-volatile memory, such as at least one disk memory.

The program 310 may be configured to cause the processor 302 to perform the following operations: recognizing whether an adjacent front vehicle exists in an adjacent lane when a spacing distance between a target vehicle and a front vehicle in a same lane is less than or equal to a blockage distance; obtaining a farthest forward-sensing distance recognized by the target vehicle from the adjacent lane when it is recognized that an adjacent front vehicle does not exist in the adjacent lane; and controlling the target vehicle to execute a lane change suppression strategy when the farthest forward-sensing distance is less than an observation distance, the lane change suppression strategy representing a strategy that prevents the target vehicle from making a lane change.

Those skilled in the art should understand that the above modules or steps of the present disclosure can be implemented by a general computing device, which may be concentrated on a single computing device or distributed across a network composed of multiple computing devices. In some embodiments, the modules or steps may be implemented by program codes executable by the computing devices, so that the modules or steps may be stored in a storage device and executed by the computing devices. Moreover, in some cases, the illustrated or described steps may be executed in sequence different from those described herein, or the modules or steps may be made into various integrated circuit modules or a single integrated circuit module for implementation. In this way, the present disclosure is not limited to any specific combination of hardware(s) and software(s).

The above descriptions are merely preferred embodiments of the present disclosure and are not intended to limit the present disclosure. For those skilled in the art, the present disclosure may have various modifications and changes. Any modifications, equivalent replacements, improvements, and the like made within the spirit and principles of the present disclosure shall fall into a protection scope of the present disclosure.

What is claimed is:

1. A control method for vehicle travelling, comprising:
recognizing whether an adjacent front vehicle exists in an adjacent lane when a spacing distance between a target vehicle and a front vehicle in a same lane is less than or equal to a blockage distance;
obtaining a farthest forward-sensing distance recognized by the target vehicle from the adjacent lane when it is recognized that an adjacent front vehicle does not exists in the adjacent lane; and
controlling the target vehicle to execute a lane change suppression strategy when the farthest forward-sensing distance is less than an observation distance, the lane change suppression strategy representing a strategy that prevents the target vehicle from making a lane change.

2. The control method according to claim 1, further comprising:
obtaining a first traveling velocity of the adjacent front vehicle when it is recognized that an adjacent front vehicle exists in the adjacent lane;
determining lane traffic efficiency of the adjacent lane based on the first traveling velocity; and
controlling the target vehicle to make a lane change to the adjacent lane when the lane traffic efficiency is greater than lane change traffic efficiency.

3. The control method according to claim 1, further comprising:

obtaining vehicle traffic efficiency of the adjacent lane when the farthest forward-sensing distance is greater than or equal to the observation distance; and controlling the target vehicle to make the lane change to a target lane when the lane traffic efficiency is greater than lane change traffic efficiency.

4. The control method according to claim 1, wherein prior to the recognizing whether an adjacent front vehicle exists in an adjacent lane, the control method further comprises:

obtaining a second traveling velocity of the front vehicle; and obtaining the spacing distance between the target vehicle and the front vehicle when the second traveling velocity is less than a preset lane velocity limit.

5. The control method according to claim 1, wherein prior to the recognizing whether an adjacent front vehicle exists in an adjacent lane, the control method further comprises:

configuring an observation distance as a preset observation distance;

obtaining lane width information and vehicle width information of the front vehicle; and determining a blockage distance in real time based on the lane width information, the vehicle width information, and the preset observation distance.

6. The control method according to claim 1, further comprising:

configuring a blockage distance as a preset blockage distance;

obtaining lane width information and vehicle width information of the front vehicle; and determining the observation distance in real time based on the lane width information, the vehicle width information, and the preset blockage distance.

7. The control method according to claim 1, wherein the controlling the target vehicle to execute a lane change suppression strategy comprises:

starting a cooling timer in the lane change suppression strategy; and continuing the control method according to claim 1 when a timing duration of the cooling timer reaches a preset cooling duration.

8. A control apparatus for vehicle travelling, comprising:

a recognition module configured to recognize whether an adjacent front vehicle exists in an adjacent lane when a spacing distance between a target vehicle and a front vehicle in a same lane is less than or equal to a blockage distance;

an obtaining module configured to obtain a farthest forward-sensing distance recognized by the target vehicle from the adjacent lane when it is recognized that an adjacent front vehicle does not exist in the adjacent lane; and a control module configured to control the target vehicle to execute a lane change suppression strategy when the farthest forward-sensing distance is less than an observation distance, the lane change suppression strategy representing a strategy that prevents the target vehicle from making a lane change.

9. A readable storage medium, storing a program or an instruction, wherein, when the program or instruction is executed by a processor, steps in the control method according to claim 1 are implemented.

* * * * *